(12) United States Patent
Jollands

(10) Patent No.: US 6,292,941 B1
(45) Date of Patent: Sep. 18, 2001

(54) OPERATING SYSTEM INSTALLATION

(75) Inventor: Thomas Derrick Jollands, Sutton (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/641,305

(22) Filed: Apr. 30, 1996

(51) Int. Cl.$^7$ ................................................. G06F 9/445
(52) U.S. Cl. ................................................. 717/11; 709/217
(58) Field of Search ................................. 395/712, 680, 395/527; 717/12, 11, 1; 710/709; 712/243; 709/100, 101, 102, 103, 104, 108, 221, 217

(56) References Cited

U.S. PATENT DOCUMENTS

| | | | |
|---|---|---|---|
| 5,142,680 | * 8/1992 | Ottman et al. | 395/712 |
| 5,155,847 | * 10/1992 | Kirouac et al. | 395/712 |
| 5,444,850 | 8/1995 | Chang | 395/200.1 |
| 5,666,495 | * 9/1997 | Yeh | 710/101 |
| 5,680,547 | 10/1997 | Chang | 395/200.01 |
| 5,799,181 | * 8/1998 | Tabuchi et al. | 712/243 |
| 5,842,024 | * 11/1998 | Choye et al. | 717/12 |
| 5,953,514 | * 9/1999 | Gochee | 395/527 |

* cited by examiner

Primary Examiner—Majid A. Banankhah
(74) Attorney, Agent, or Firm—Finnegan, Henderson, Farabow, Garrett & Dunner, L.L.P.

(57) ABSTRACT

The invention relates to the installation of an operating system at a local computer connected or connectable to a remote management computer. To do this a standard operating system is provided on a storage medium at the local computer. Then a modular definition of an operating system model, defining a customised configuration of the standard operating system, is supplied from a memory at the management computer to the local computer. The standard installation of the operating system to a memory of the local computer is performed using the standard operating system on the storage medium and, in addition, this is customized using the model. The use of a modular definition of a model of a customized operating system installation facilitates the maintenance of the customized installation procedure.

16 Claims, 8 Drawing Sheets

EXAMPLE: B03archive_data -> ../../../../Modules/Std/Generic/archive_data

OPERATING SYSTEM INSTALLATION

BACKGROUND AND INTRODUCTION

The invention relates to methods and apparatus for the installation of operating systems in computers.

The invention finds particular application in the installation of operating systems in computers which are linked by means of a network, for example a local area network.

Typically, for installing an operating system at a local computer, it is necessary to supply a data storage medium, for example a CD-ROM or floppy disk carrying the operating system, this being inserted into an appropriate reader at the local computer and to perform the installation in accordance with the operating system supplier's instructions. Typically, the operating system provides a standard configuration of the operating system at the local computer. After, or during basic installation it is often possible to customise the installation depending on the requirements of the user. However, in this case the customization is performed by the user and there is no control over the customization.

Where the local computer forms part of a computer network, for example within an organisation, it is desirable that limits are put on the customization which is effected on installation of the operating system. Indeed, it is desirable that the customization is standardised. This facilitates the achievement of compatibility throughout a network. However, there are added benefits in that a user not at his or her normal workstation can still readily use another workstation because the basic configuration will be familiar, even if there are differences at a local level due to local or regional requirements. As well as some local or regional requirements, for example depending on the country in which the installation is performed, the customization which is needed will also depend on hardware characteristics of the local computer and also the function of the local computer, for example as a client workstation, or as a server in a local area network.

It has been proposed to control the customization of the local computer by providing additional media (for example floppy disks) which are used in combination with the media carrying the operating system, in order to control the installation of the operating system at the local computers. However, the maintenance of the installation software is a very expensive task due to the rapid changes in hardware and software configurations. Even relatively minor changes to the installation software can result in significant consequential changes being needed.

It will be appreciated that the installation of operating systems at local computers which form part of a network presents significant technical problems. These result from the need to permit standardisation, while still permitting the installation of the operating system to be customised depending upon the hardware configuration of the computer concerned and also its function (for example a workstation providing a user desktop, or a server for a network). Accordingly, the present invention seeks to mitigate the technical problems associated with the installation of an operating system in local computer which is connected or connectable to a remote management computer.

SUMMARY OF THE INVENTION

In accordance with a first aspect of the invention, therefore, there is provided an automated method of installing an operating system at a local computer connected or connectable to a remote management computer, said method comprising:

(a) providing a standard operating system on a storage medium at said local computer;

(b) supplying, from a memory at said management computer and via a connection to said local computer, a modular definition of an operating system model, said model defining a customised configuration of said standard operating system;

(c) performing a standard installation of said operating system to a memory of said local computer; and (d) employing said model to perform customization of said operating system.

The use of a modular definition of a model of a customised operating system installation facilitates the maintenance of the customised installation to take account of changes in hardware and software, as well as local or regional requirements. By selection of predetermined self-contained modules to form the model, a high degree of flexibility can be achieved while still permitting the customization to be constrained to fall within guidelines of a network operator in order to achieve compatibility and uniformity.

Preferably, at least one model defines an operating system configuration for a client workstation. This is probably the most common installation to be performed. However, other models can be directed to the installation of a local server, a portable workstation, etc.

Preferably, a hierarchical database is provided in the memory at the central computer for controlling the customization, wherein each model is defined in terms of a set of modules, each module of the set being self-contained and defining an installation customization operation.

The hierarchical structure facilitates execution of the installation process and permits the assembly of a sequence of modules for implementing the model.

In a preferred example, the modules define respective post-processing operations following the standard installation. For example, for at least one model, the modules define respective post-processing operations selected from the following list:

installation of files for remote systems access;

setting of boot target addresses;

installation of patches;

restoration of archived data and/or software;

installation of unbundled software; and securing of the operating system.

Alternatively, or in addition, the modules can define respective pre-processing operations performed prior to the standard installation. In this case, for at least one model, the modules define respective post-processing operations selected from the following list:

setting hardware characteristics; and automatically archiving data and/or software for subsequent restoration.

The installation is preferably responsive to hardware configuration data for the local computer in a rules file to identify an appropriate model file in the hierarchy for customization of the operating system.

In the preferred embodiment, the model file defines the modules by means of links within the hierarchy.

In accordance with another aspect of the invention, there is provided a management system for controlling the installation of an operating system on a local computer, said management system being stored at a management computer remote from said local computer, said local computer being connected or connectable to said management computer, wherein said management system comprises at least one modular definition of a model of a customised configuration of said standard operating system and said management system is arranged to be responsive to initiation of an installation process using a standard operating system on a storage medium at said local computer to identify a model and to supply said model from a memory at said management computer via a connection said local computer to perform customization of said operating system at said local computer.

Preferably, the management system comprises a database including a plurality of files including:

a hierarchical data structure including a plurality of files including files defining a module of at least one operating system model for customising an operating system at a local computer;

at least one rules file defining hardware characteristics of a possible local computer on which an operation system is to be configured;

the management system being arranged to identify parameters for identifying modules of a model from the rules file.

In accordance with a further aspect of the invention, there is provided a management computer comprising a memory, a processor, a communications interface, wherein the communications interface enables the management computer to be connected to at least one local computer on which an operating system is to be installed and wherein the management computer is locatable remotely from the local computer, and a memory, wherein the processor is arranged to be responsive to a management system stored in the memory for installing a customised operating system at the local computer.

The invention also provides a computer network including at least one management computer as defined above and at least one local computer at which an operating system is to be or has been installed.

The invention further provides a process of installing an operation system at a local computer comprising the provision, at that local computer, of remotely supplied customising functions provided in accordance with the method as defined above.

DESCRIPTION OF THE DRAWINGS

An embodiment of the invention will be described hereinafter with reference to the accompanying drawings, in which.

DETAILED DESCRIPTION OF THE PREFERRED EMBODIMENT

Figure 1:
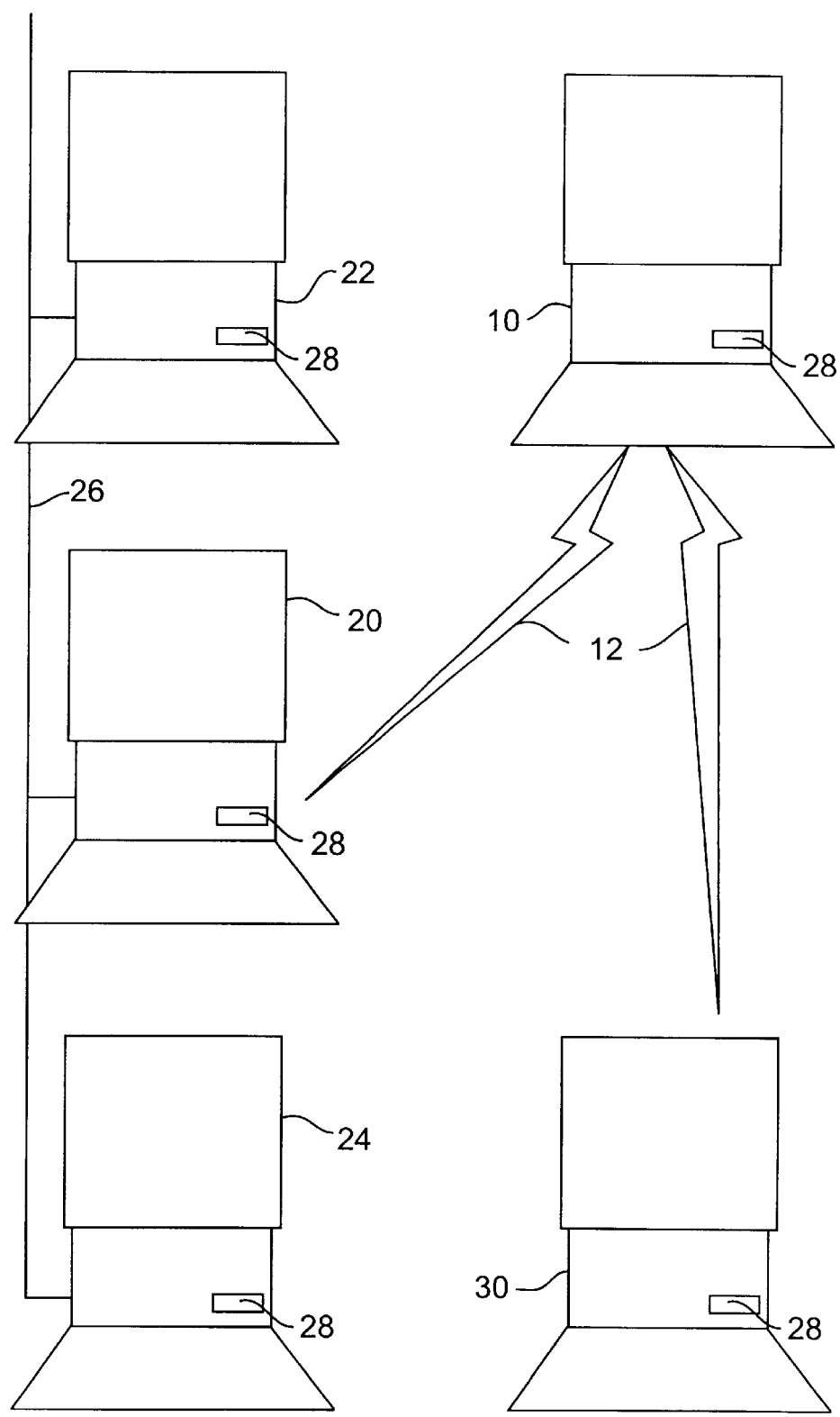
FIG. 1 is a schematic block diagram representing a number of computers in a computer network.

FIG. 1 is a schematic diagram representing a central management computer 10 which is connected or connectable by links 12 to one or more local computers 20 and 30. The local computers may serve different functions. Thus, for example, computer 20 is a server on a computer network which includes other computers 22 and 24, connected to the server via a local area network 26. Computer 30, however, is a client workstation, which could for example, also be a client workstation on the local area network 26.

Each of the computers 10, 20, 22, 24 and 30 is provided with a reader for one or more types of data storage medium. In FIG. 1 only one type of reader, in the form of a slot 28 for a CD ROM is shown, although it will be appreciated that readers for other media, for example for floppy discs or a network based reader, could be provided.

Figure 2:
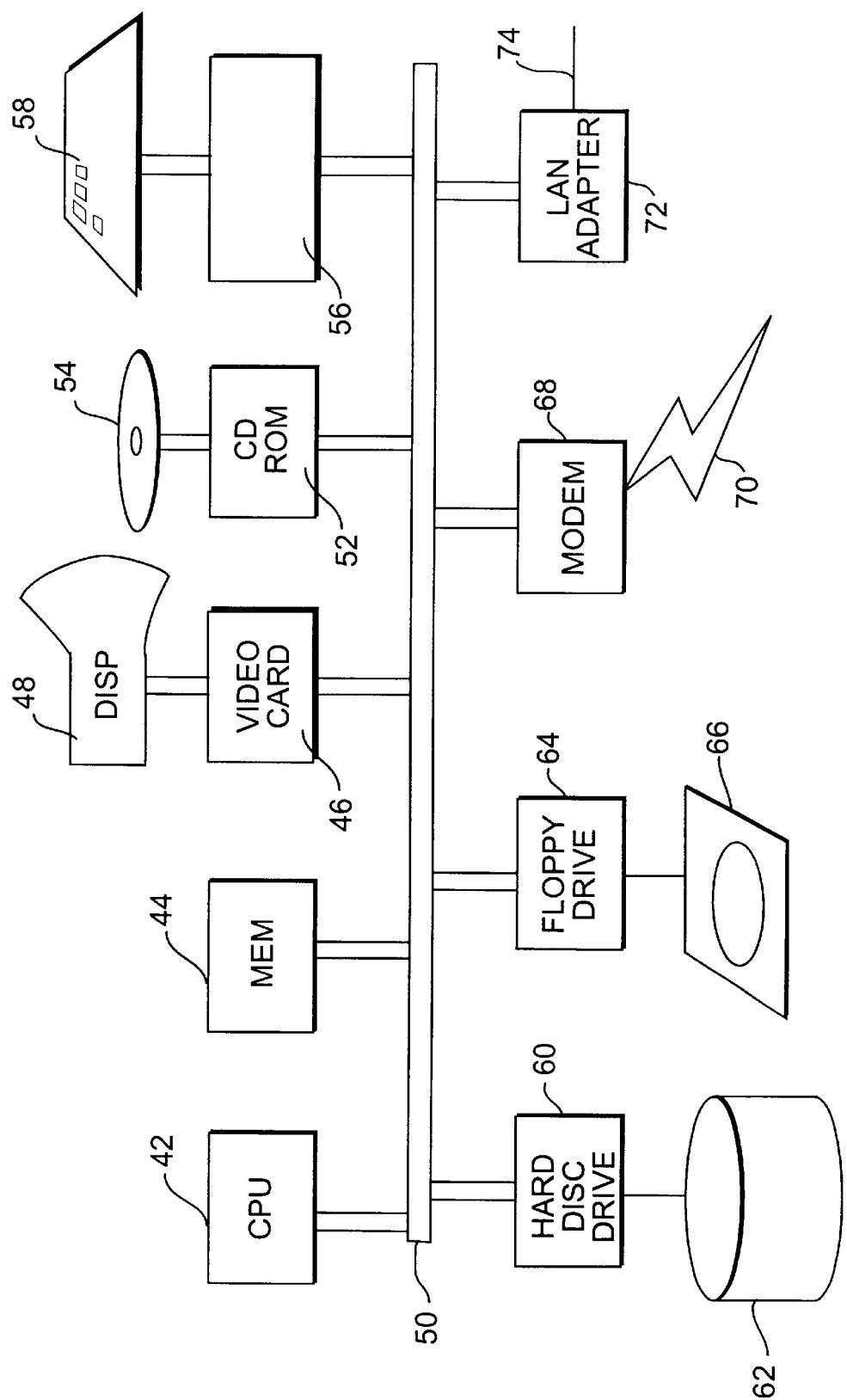
FIG. 2 is a schematic representation of a computer configuration.

Each of the computers can have any conventional configuration. For example, FIG. 2 is a schematic representation of one possible configuration of a computer 40 having a processor 42, memory 44 (which can include read-only and random access memory) a video interface 46 to a display 48, a CD ROM interface connected to a CD-ROM reader 54, an I/O interface 56 connected to user input devices such as a keyboard 58, a disk drive adapter 60 connected to hard disk 62 and/or a floppy drive connector 64 connected to a floppy drive 66, a modem card 64 connected to a telephone line 70 and/or a local area network adapter 72 connected to a local area network 74. As shown in FIG. 2, all of the adapter components are connected via common bus 50 to the processor 42 and memory 44. However, it will be appreciated that other configurations are possible, and indeed commonplace, FIG. 2 merely being a schematic representation of one possible configuration.

Figure 3:
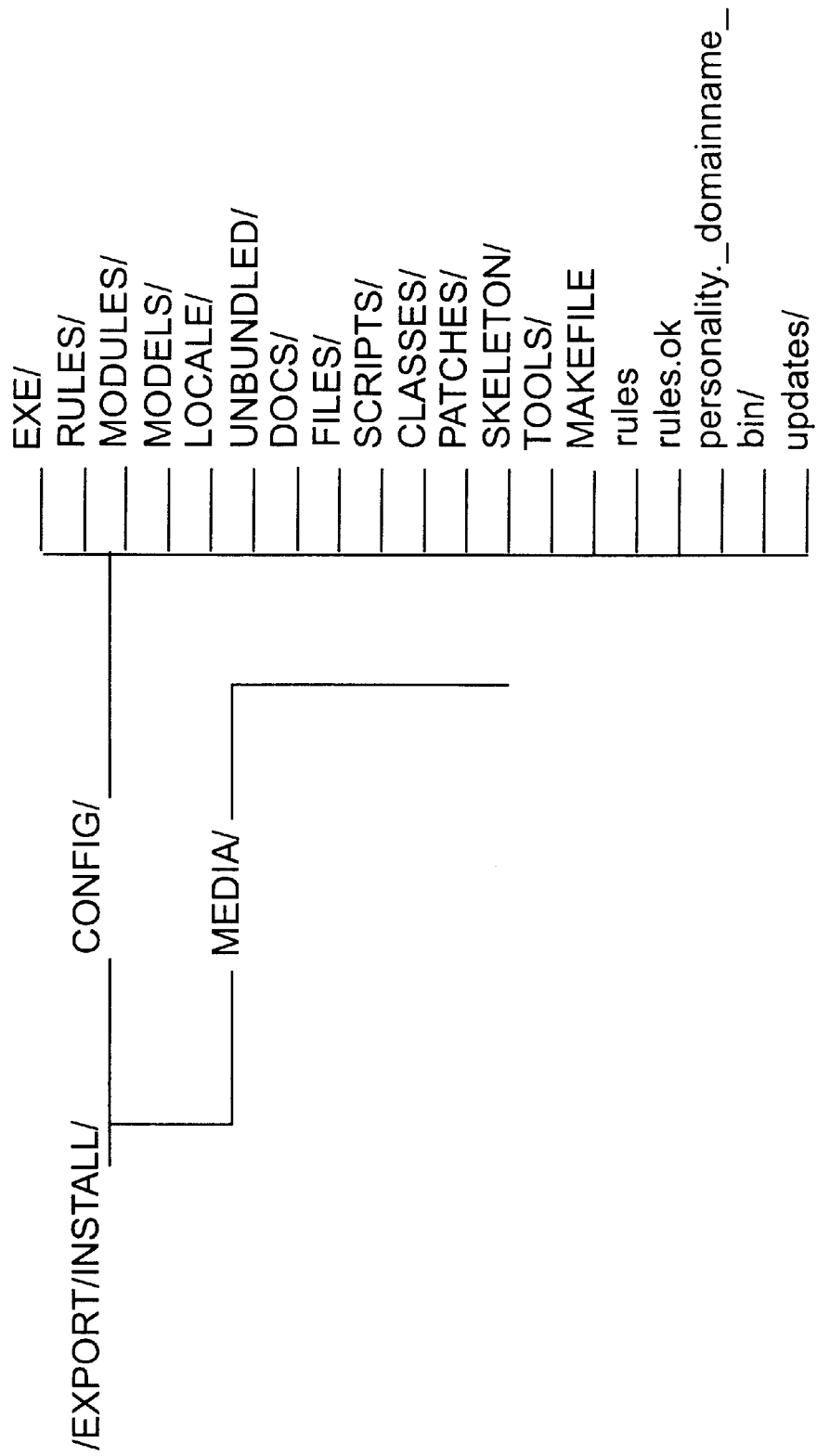
FIG. 3 represents part of a directory structure located at a central management computer in the network of FIG. 1.

FIG. 3 represents part of a directory structure located at a central management computer in the network of FIG. 1. This directory structure provides the basis for enabling a centralized management of autoinstallation of operating systems over a network. It provides a vehicle for the standardization of an installation process over the whole network, possibly spanning the world. It also provides the basis for enabling a field replaceable desktop install process for users who wish to enjoy the benefits of autoinstallation of a standard desktop whilst retaining root access and enables the reduction of the root owner's administrative overhead.

FIG. 3 illustrates the higher levels in the directory structure. Lower layers are described with reference to FIGS. 4–8 below. The directory structure is configured at the management computer and controls and coordinates the autoinstallation process. This directory structure, as will become clear later on, provides a start-up process where the presence of a script in a directory identifies it as a component of a particular model representing a particular installation configuration and its name determines the order of execution of the script.

In FIG. 3, the head node in the structure is represented by the 'export/install' directory which contains the necessary files for controlling the export and installation functions.

One subdirectory called 'media' contains the files necessary for operating system images. This is not necessary for an understanding of the present invention and accordingly will not be described further herein.

Another subdirectory is the so-called 'config' (configuration) directory. It is this directory which contains the files for controlling the configuration of the operating system as part of the autoinstallation process.

'Exe' is a directory for containing the autoinstallation 'begin' and 'finish' script files, as will be described in more detail with respect to FIG. 4.

Figure 4:
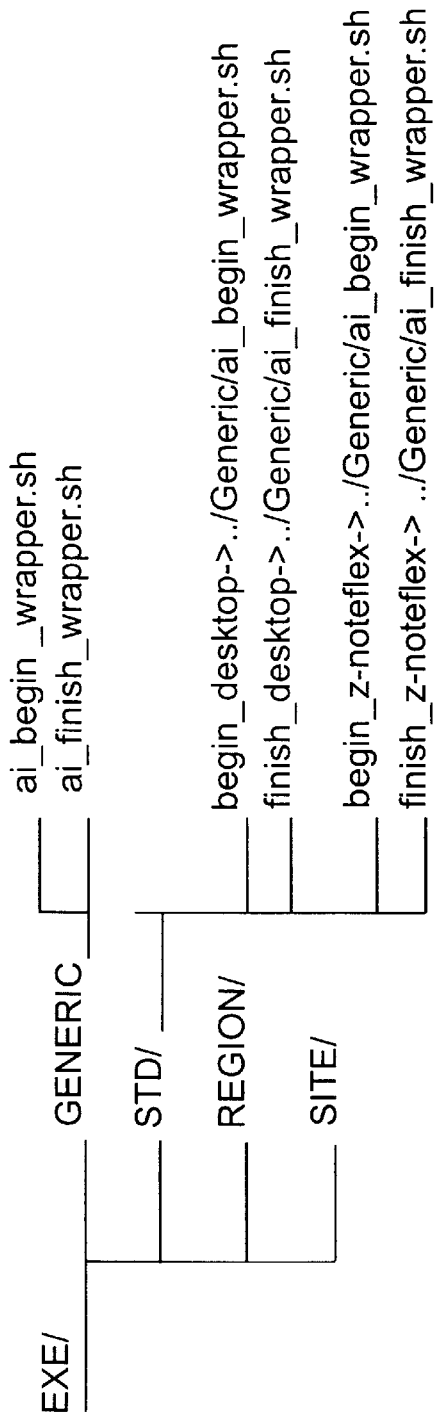
FIG. 4 represents a wrapper files part of the directory structure of FIG. 3.

As shown in FIG. 4, it can be seen that the 'exe' directory includes a 'std' (standard) directory. This is used to hold a hierarchy which is used by the management computer to control the autoinstallation process. The 'std' directory holds 'begin_wrapper' and 'finish_wrapper' files, which contain generic scripts which provide the basic environment and rules of the autoinstallation process.

The wrapper defines variables including:
'model', which is derived from the name of the begin/finish link;
'os_ver', which is an operating system version value;
'domain', which is a first field value;
'geo', which is a geographical domain;
'date_stamp', which is a date, hour minute extended date stamp;
'slash_a' which is a writable root tree value;
'locale', which is a default domain locale (location); and
'proc', which is a generic processor type.

To reference the generic scripts, symbolic links of the form 'begin_desktop', 'finish_desktop', 'begin_server', 'finish_server' and so on, as illustrated in FIG. 4, are generated. These linked files are then called during the autoinstallation process.

The extension following the 'begin_' or 'finish_' in the link name format determines the directory name to be referenced for the operating system build. For example, 'finish_desktop' will execute all scripts referenced in the directory '/export/install/config/Modules/Std/desktop'. Likewise, if the link is named 'begin_server', a directory ' . . . /server' would be referenced, and so on.

The extension refers to a directory name and encapsulates the concept of a 'model' object which persists throughout the elements of the build process.

The site and region directories are used to hold a locally managed hierarchy (i.e., not managed by the management computer, but by lower level computers having management functions) for locally developed scripts and/or one-off local links to the standard (Std) scripts.

Figure 5:
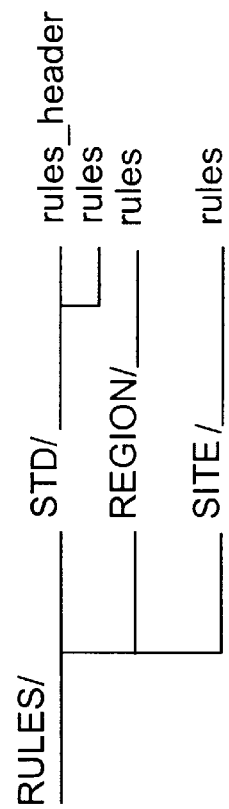
FIG. 5 represents a rules file part of the directory structure of FIG. 3.

The 'rules' directory as illustrated in FIG. 5 is also divided into 'std' (standard), 'region' and 'site' subdirectories, and provides rules which are managed respectively from the central management computer, from a regional area control computer and at a local level.

The 'rules' file format is as follows:
'keyword[rule_value] begin class_file finish'
The individual fields of the rule file format are described below:
'keyword'—for standard rules the keyword is based on disk capacity and target address plus memory configuration, and for site rules the keyword is usually based on a hostname.
'begin'—provides an entry which reads 'exe/begin_ <model>', where <model> matches the extension assigned to the begin link for the model under the directory Exe/<region>.
'class_file'—provides a class file entry.
'finish'—provides an entry which reads 'exe/finish_ <model>', where <model> matches the extension assigned to the finish link for the model under the directory Exe/<region>.

A script 'make_rules' when executed will take the rules files from each directory and produce a file
/export/install/config/rules
from which is generated the file
/export/install/config/rules.ok
which is in turn used by autoinstallation to match the system with software and hardware configuration classes.

Figure 6:
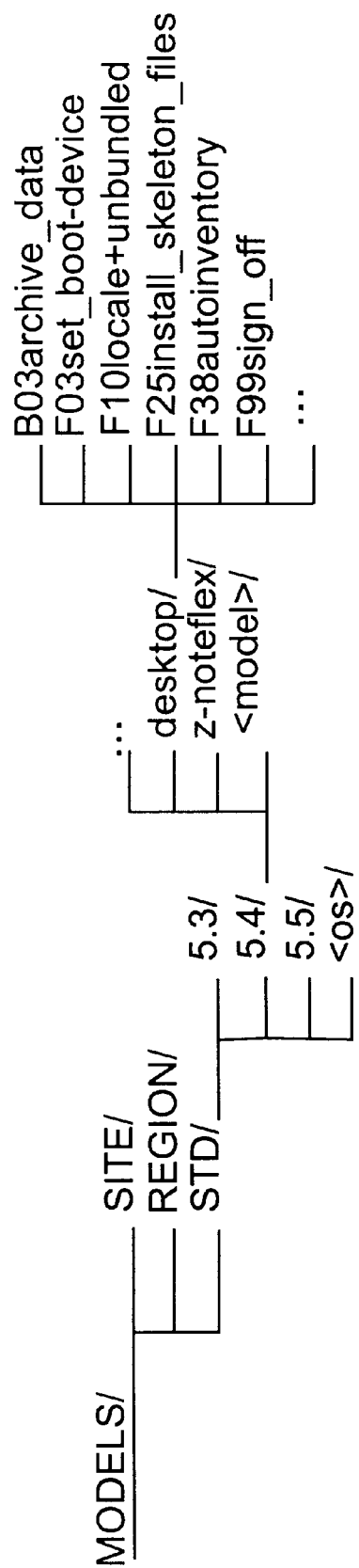
FIG. 6 represents a models part of the directory structure of FIG. 3.

FIG. 6 illustrates a models part of the directory structure of FIG. 3. Under the 'models' directory a 'std' (standard) directory holds files maintained from the central management computer. This is where system models are defined by virtue of the name of the sub-directories under the 'std' directory and the links therein. As illustrated in FIG. 6, standard default directories are 'desktop' and 'server', which correspond respectfully to '[begin|finish]_desktop' and '[begin|finish]_server', respectfully, in the directory Exe/Std.

The building of the 'model' is effected via the wrappers under the directory 'exe_Std' and conventions for creating begin and finish links under the 'exe/<region>' directory structure. The model is thus defined by creating the 'begin' and 'finish' links, whereby the tasks which the model performs are defined by the symbolic links created in the model directory structure.

The modules identified at the lowest level of the tree in FIG. 6 are executed in numerical order in accordance with the assigned numeric value (which in this example ranges from 0–99). The convention applied in the present example for the naming of links is: '[B/F][0–9][0–9]_descriptive_ string_', where 'B' indicates a 'begin' link and 'F' indicates a 'finish' link.

The 'site' and 'region' sub-directories illustrated in FIG. 6 relate to locally managed parts of the hierarchy (i.e., parts not managed by the central management computer). These directories can be used to hold all local model definition directories which are not a part of the standard scheme.

Figure 7:
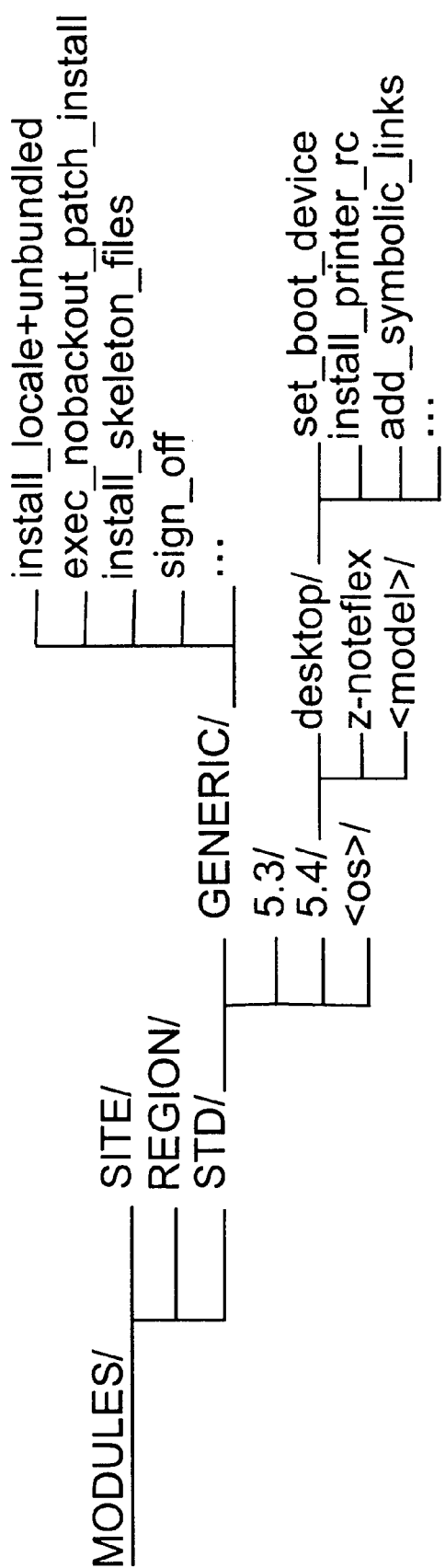
FIG. 7 represents a modules part of the directory structure of FIG. 3.

FIG. 7 illustrates a 'modules' part of the directory structure of FIG. 3. The 'modules' directory is a repository directory in the sense that no component of the autoinstallation process should access the 'modules' directory directly. Under the 'modules' directory, a 'std' (standard) directory holds files which are maintained by the central management computer.

None of the scripts (files) located below the 'modules' directory should be called directly. They are source files which are referenced via symbolic links in the modules directory hierarchy. The reason for this is that an aim of the autoinstallation process is to simplify the maintenance of the begin and finish script files and to accept that the vast majority of the customising tasks are identical independent of the system type. The name 'modules' arises from the arrangement that each function of the of the customising process is undertaken by a standalone 'module'. In the preferred example, each 'module' is an independent Bourne shell script. Accordingly, no single module should have a dependence upon any other module. The directory structure is designed such that the required modules are plugged into the model by means of the symbolic links mentioned above. The modules are chosen to have meaningful names and the scripts adhere to autoinstallation conventions for specifying path names and so on.

Not all of the modules are necessarily called by all install models, the links in the model hierarchy being used to determine which modules are called and in which order.

FIG. 7 also illustrates 'site' and 'region' sub-directories. These relate to locally managed parts of the hierarchy (i.e. not managed by the central management computer) and hold all local modules which are not a part of the standard scheme. If the hierarchy under the 'site' or 'region' directories conforms to directory structure under the 'std' directory, then references in the 'site' or 'region' directories will be called as part of a standard installation process in a manner which ensures that local changes and modifications will always prevail.

Figure 8:
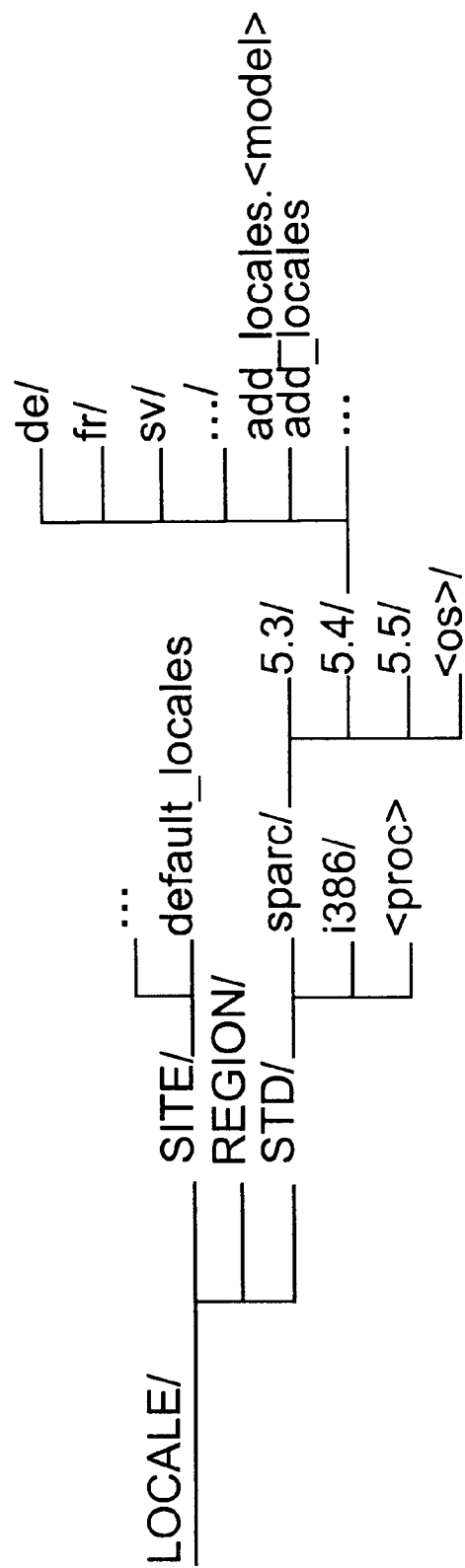
FIG. 8 represents a location part of the directory structure of FIG. 3.

FIG. 8 illustrates a 'locale' part of the directory structure of FIG. 3. As for the other directory structures described above, 'std' (standard), 'site' and 'region' sub-directories are provided. These follow the same general patterns as described above for other directories. The 'locale' directory tree assists in providing a globally consistent installation. Locale packages can be separated from the media image from the CD-ROM provided for the standard installation and can be distributed globally enabling any client to be installed with any locale or group of locales in a straightforward manner. The locales are stored in directories which reflect the nature of the locale using standard identifiers as directory names (e.g., 'de' for Germany).

Also shown in FIG. 3 are a number of further directories, some of which are briefly described below.

The 'patches' directory takes account of need to provide standardization and enables patches to be managed centrally and in a generic manner.

The 'classes' directory facilitates the management of the hierarchy. This part of the directory tree holds files which are referenced via the autoinstallation rules. There is no dynamic referencing of operating system release levels etc. However a naming convention can be used which follows an intuitive pattern and can be readily associated with the named models. A 'std' directory can be managed from the central management computer, whereas 'site' and 'region' directories can be locally managed.

The 'scripts' directory part of the directory tree is intended to provide the ability to deliver customising scripts which would generally be transient in nature to correct spurious problems with the operating system. Examples of this are the installation of 'work-arounds' for which patches are not available, the installation of inter-leaf links in the hierarchy, and so on.

Operating system version numbers are maintained immediately below a 'std' directory. Under this directory there are found directories or Bourne shell scripts with names matching the finish model name extension. Directories can be accessed and all scripts therein executed and scripts will be executed, both in accordance with the model be installed. As for other directories, as well as a 'std' directory, locally managed 'site' and 'region' directories are provided. If a entries under the 'site' and 'region' directories correspond to the hierarchy under the 'std' directory, they will be executed as part of the standard installation. In addition, directories or scripts corresponding to '__domainname__', '__hostname__' or '__ip__addr__' which match the current environment are also acted upon.

The Skeleton directory is used to install ASCII files. Files added to the skeleton directory have header information added which specifies where the file is to be located and what its permissions should be. The header fields are extended to support the specification of owner and group IDs. There is also a field to specify that the file contents can be appended to the existing file rather than simply replacing it. Under a 'std' (standard) directory a set of operating system specific skeleton subdirectories are maintained which should match the system model being used. Skeleton files within these directories are in ASCII (or textual, i.e. Postscript) format and contain the required header information. If no header information is present, files are ignored. As with previous directories, 'site' and 'region' options are provided. If entries under 'site' and 'region' directories correspond to the hierarchy under the 'std' directory, they will be installed as part of a standard autoinstallation process. In addition, directories corresponding to '__domainname__', '__hostname__' or '__ip__addr__' which match the current environment are also checked for the presence of skeleton files.

A 'personality' directory provides local domain configuration information and is not maintained by the master server.

A 'docs' directory holds all shared documentation under a 'std' (standard) directory, which can be region specific or generic to the standard installation but has to be maintained at the central management computer and distributed. Site and 'region' directories are provided for locally managed documentation.

A 'tools' directory contains a 'std' directory for shared tools and 'site' and 'region' directories for locally managed tools.

An additional optional 'backup' directory (not shown) could be provided under the '/export/install/' directory in the database structure of FIG. 3. This can be used to assist providing reliable archival of system data during the autoinstallation process. This can avoid the loss of data if the system were to terminate part way though the installation build process.

Figure 9:
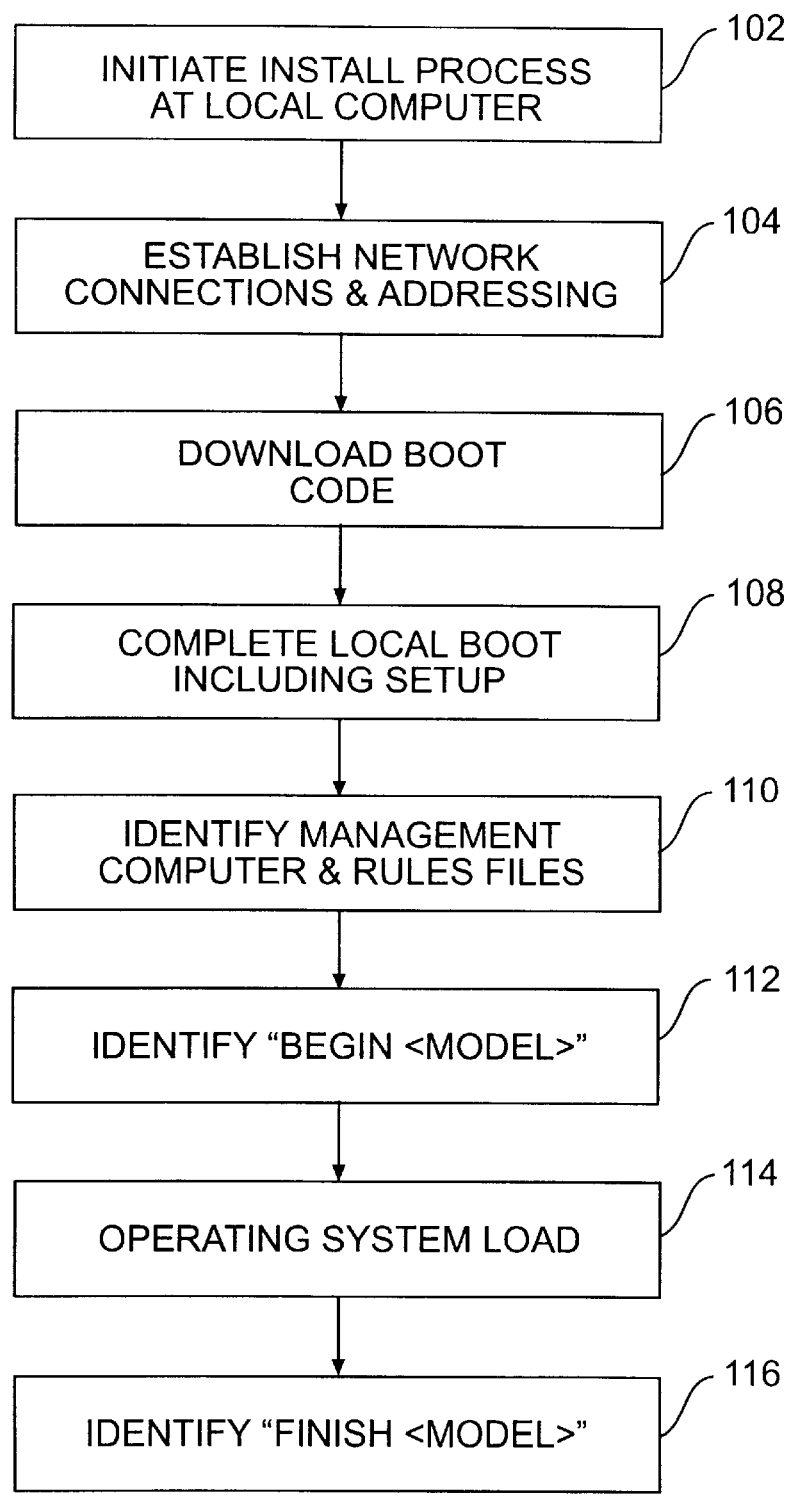
FIG. 9 is a flow diagram illustrating the steps performed during a typical installation.

FIG. 9 is a flow diagram giving an overview of the autoinstallation process including the passage of control during that process.

The initiation of the process is caused at step 102 by the operator at the local computer on which the operating system is to be installed selecting a monitor prompt and then entering a command 'boot net—install' for a network controlled installation process.

In step 104, the network connections and addresses are established. This includes the local computer broadcasting an address over the network. This initiates an exchange with the domain control computer to enable addressing so that the local computer is able to identify itself to the management computer.

In step 106, a boot server computer downloads bootstrap code permitting the local computer to reach a basic operational level which enables it to access remote services.

In step 108, the local computer or a local area network server for the local computer completes booting and the local computer initiates the autoinstallation setup and configuration process.

In step 110, the client system identifies the management computer using a daemon and validates the identification of the management computer by examining a configuration directory for the rules file.

The operating system load follows when operating system load and configuration rules have been identified from keywords in the rules file. It is the matching of a rules entry having the appropriate local system configuration which starts the customization and installation process.

In step 112, a 'begin<model>' script is accessed via the hierarchy using the rules file entries and is executed.

In step 114, the operating system is loaded from the operating system media.

In step 116, the 'finish<model>' script is accessed via the hierarchy using the rules file entries and is executed.

Thus there has been described an autoinstallation process and system in which a modular approach to the pre- and/or post-processing stages of an operating system installation process is effected using modular operating system configuring processes installation, each processing module being independent and self sufficient. This facilitates the maintenance of the centralized autoinstallation process as changes to one module can be made without requiring a complete revision of the remainder of the autoinstallation software. A standard operating system is provided on a storage medium at a local computer. Then a modular definition of an operating system model, defining a customised configuration of the standard operating system is supplied from a memory at the central computer to the local computer. The standard installation of the operating system to a memory of the local computer is performed using the standard operating system on the storage medium and, in addition, this is customised using the model. The use of a modular definition of a model of a customised operating system installation facilitates the maintenance of the customised installation procedure.

In this example, the installation of a UNIX-based operating system (UNIX is a registered trademark in the United States and other countries, exclusively licensed through X/Open Company, Ltd.) is described in the context of a local area network. Also, the management system is implemented by means of software stored in the memory of the central management computer and is operative to control the processor of the management computer to implement the auto-installation process.

However, although a particular embodiment of the invention has been described, it will be appreciated that many modifications and/or additions thereto may be made within the spirit and scope of the invention.

For example, although in the particularly described embodiment the management system is implemented by means of software which is stored in memory at a central management computer and is operative to control the management computer to carry out the autoinstallation process, it will be appreciated that at least some of the functions of the management system could be implemented by means of special purpose hardware.

Also, although the invention has been described in the context of a UNIX environment on a local area network, it will be appreciated that other embodiments could equally be implemented in the context of another operating system and/or another form of network.

What I claim is:

1. A computer-implemented method of installing an operating system at a local computer connected to a remote management computer, said method comprising:
   (a) providing a standard operating system on a removable storage medium at said local computer;
   (b) supplying, from a memory at said management computer and via a connection to said local computer, a modular definition of an operating system model, said model defining a customized configuration of said standard operating system;
   (c) performing a standard installation of said operating system from the removable storage medium at said local computer to a memory of said local computer; and
   (d) employing said model to perform customization of said operating system in the memory of the local computer.

2. A method according to claim 1, wherein at least one model defines an operating system configuration for a client workstation.

3. A method according to claim 1, comprising the additional step of providing, in said memory at said management computer, a hierarchical database for controlling said customization, wherein each said model is defined in terms of a set of modules, each module of said set being self-contained and defining an installation customization operation.

4. A method according to claim 3, wherein said modules define respective post-processing operations following said standard installation.

5. A method according to claim 4, wherein, for at least one model, said modules define respective post-processing operations selected from the following list:

installation of files for remote systems access;

setting of boot target addresses;

installation of patches;

restoration of archived data and/or software;

installation of unbundled software; and securing of the operating system.

6. A method according to claim 3, wherein said modules define respective pre-processing operations performed prior to said standard installation.

7. A method according to claim 6, wherein, for at least one model, said modules define respective post-processing operations selected from the following list:

setting hardware characteristics; and automatically archiving data and or software for subsequent restoration.

8. A method according to claim 3, wherein said installation is responsive to hardware configuration data for said local computer in a rules file to identify an appropriate model file in said hierarchy for customization of said operating system.

9. A method according to claim 8, wherein said model file defines the modules by means of links within said hierarchy.

10. A management system for controlling the installation of an operating system on a local computer, wherein:

said management system is stored at a management computer remote from said local computer;

said local computer is connected to said management computer via a network;

said management system comprises at least one modular definition of a model of a customized configuration of said standard operating system; and said management system is arranged to be responsive to initiation of an installation of a standard operating system from a removable storage medium at said local computer to identify the model and to supply said model from a memory at said management computer via a connection to said local computer, the model being used to perform customization of said operating system at said local computer.

11. A management system according to claim 10 comprising a database including a plurality of files including:

a hierarchical data structure including a plurality of files including files defining a model of at least one operating system model for customizing an operating system at a local computer;

at least one rules file defining hardware characteristics of a possible local computer on which an operation system is to be configured;

said management system being arranged to identify parameters for identifying modules of a said model from said rules file.

12. A management computer comprising:

a memory;

a processor;

a communications interface;

wherein said communications interface enables said management computer to be connected to at least one local computer on which an operating system is to be installed, wherein said management computer is remotely located from said local computer and wherein said processor is responsive to a management system according to claim 10 stored in said memory for installing a customized operating system at said local computer.

13. A computer network including at least one management computer according to claim 12 and at least one local computer at which an operating system is to be or has been installed.

14. A process of installing an operation system at a local computer comprising the step of providing, at said local computer, remotely supplied customising functions provided in accordance with the method of claim 1.

15. A method of installing an operating system on a first computer, comprising:

providing a standard operating system from a removable storage medium;

providing a connection to a second computer;

receiving an instruction set from the second computer for installing a particular operating system on the first computer; and installing the particular operating system using the instruction set from the second computer and the standard operating system on the removable storage medium.

16. A method of installing an operating system in a first memory associated with a first computer, comprising:

providing a standard operating system in a second memory associated with said first computer;

providing a connection to a second computer;

receiving an instruction set from the second computer for installing a particular operating system in the first memory; and installing the particular operating system in the first memory using the instruction set from the second computer and the standard operating system in the second memory.

* * * * *

UNITED STATES PATENT AND TRADEMARK OFFICE
CERTIFICATE OF CORRECTION

PATENT NO. : 6,292,941 B1
DATED : September 18, 2001
INVENTOR(S) : Thomas D. Jollands It is certified that error appears in the above-identified patent and that said Letters Patent is hereby corrected as shown below:

Title page,
Item [57], ABSTRACT,
Line 6, "customised" should read -- customized --

Column 11, claim 14,
Line 7, "customising" should read -- customizing --.

Signed and Sealed this

Twelfth Day of March, 2002

Attest:

JAMES E. ROGAN
Attesting Officer
Director of the United States Patent and Trademark Office